Sept. 12, 1967         H. G. NÖLLER         3,340,866

INGESTIBLE $pH$ RESPONSIVE RADIO TRANSMITTER

Filed July 1, 1964

INVENTOR.
HANS GÜNTER NÖLLER

BY *Hans Berman*

AGENT

United States Patent Office 3,340,866
Patented Sept. 12, 1967

3,340,866
INGESTIBLE pH RESPONSIVE RADIO
TRANSMITTER
Hans Günter Nöller, Fasanenweg 4,
Heidelberg, Germany
Filed July 1, 1964, Ser. No. 379,683
Claims priority, application Germany, Dec. 31, 1958,
N 16,066
8 Claims. (Cl. 128—2)

This application is a continuation-in-part of my copending application Ser. No. 859,735, filed on Dec. 15, 1959, now abandoned.

This invention relates to the determination of hydrogen ion concentration in the human alimentary canal, and more particularly to a radio transmitter which may be swallowed, and which emits radio signals indicative of the hydrogen ion concentration in the ambient gastric or intestinal fluid.

Transmitters capable of being swallowed are known. The known transmitters are relatively large so that their presence in itself affects the environment in which they are intended to operate, and their signals are not precisely representative of the conditions which it is desired to ascertain. The relatively large known devices may be inserted into the stomach, but it is not entirely safe to permit them to pass through the body.

The primary object of the instant invention is the provision of a pH responsive radio transmitter small enough to be swallowed and to be passed through the entire alimentary canal without requiring special precautions, and without reaction from the intestinal tract.

Another object is the provision of such a transmitter which, despite its small overall dimensions, is capable of operating for the maximum period of passage through the alimentary canal usually encountered in clinical investigations.

A further object is the provision of a pH responsive radio transmitter which permits precise measurements of stomach acidity in a simple manner suitable for routine clinical tests.

An additional object is the provision of a transmitter adapted to control a recording instrument in such a manner that the hydrogen ion concentration of the entire alimentary tract may be recorded without emotional or physical trauma to the patient.

With these and other objects in view, as will hereinafter appear, the invention in one of its aspects resides in an oscillator preferably having capacitative feedback, and energized by a battery having two spaced electrodes. The oscillator is arranged in circuit with pH sensing means consisting of a testing electrode and a reference electrode. One of the electrodes of the pH sensing means is constituted by one of the battery electrodes. The oscillator is enclosed in a liquid impervious casing from which the three electrodes project so that they may be wetted by an electrolyte, such as ambient gastric or intestinal fluid, which closes the circuits between the electrodes.

Other features and many of the attendant advantages of this invention will be readily apparent from consideration of the following specification relating to the annexed drawing in which:

FIG. 1 is the circuit diagram of a transmitter of the invention whose frequency is indicative of the pH of an ambient liquid. The circuit components illustrated have the following values:

| | |
|---|---|
| $Tr$ | Transistor type OC 345. |
| $L_1$ | Coil of 124 microhenrys. |
| $L_2$ | Coil of 124 microhenrys. |
| $R_1$ | 25,000 ohm resistor. |
| $C_1$ | 50 pf. capacitor. |
| $C_2$ | 175 pf. capacitor. |
| $C_3$ | 75 pf. capacitor. |

The circuit is capable of oscillating at very high frequencies because of the use of the sub-miniature transistor $Tr$ (OC 345), and is assembled from sub-miniature components exclusively. It is powered by a battery which has a magnesium cathode $E_1$, and an anode $E_2$ which is of the type Ag/AgCl. When such a battery is unintentionally destroyed as by chewing, the electrodes are non-toxic to the patient.

The pH of ambient gastric or intestinal fluid is determined by a very small pH sensing arrangement consisting of an antimony testing electrode $E_3$ and the Ag/AgCl electrode $E_2$ of the battery which simultaneously serves as a reference electrode. The pH sensing arrangement is placed in the base lead of the transistor $Tr$. When the three electrodes are wetted by an electrolyte, the transmitter starts oscillating. Its frequency is a function of the voltage of the pH measuring electrodes. When the transmitter is swallowed, the voltage difference of the pH measuring electrodes is dependent on the pH value of the ambient gastric liquid first sensed by the electrodes.

Figure 2:
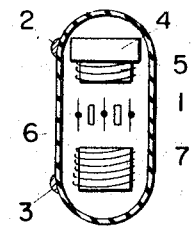
FIG. 2 is a sectional view of a transmitter of the invention.

The mechanical arrangement of the circuit elements is shown in FIG. 2. The transmitter, including its current supply $E_1$, $E_2$, has a volume of only about 150 cubic millimeters, and constitutes a cylinder 8 mm. long and 5 mm. in diameter. It has only one eighth of the volume of the smallest ingestible pH responsive transmitter known heretofore. I have constructed and used transmitters as small as 7 mm. long and 4 mm. in diameter.

The oscillator is contained in an outer casing 1 impervious to gastric and intestinal fluids. Two electrodes 2, 3 of the three transmitter electrodes arranged on the outside of the casing 1 are visible in the drawing. The transistor 4 carries a coil 5 ($L_2$ in the diagram of FIG. 1). A coil 7 is separately mounted ($L_1$ in the diagram of FIG. 1). The several resistors and capacitors constitute an array 6 between the two coils 5 and 7.

Figure 3:
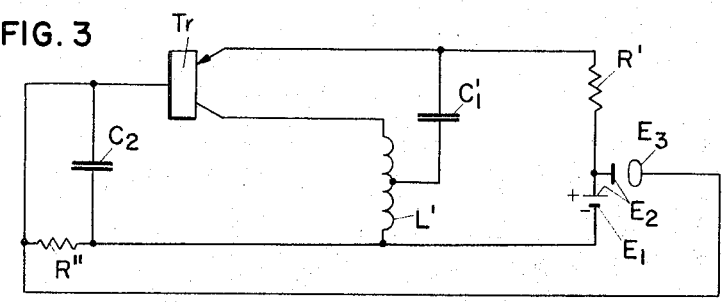
FIG. 3 is the circuit diagram of another pH responsive transmitter of the invention.

The circuit diagram of a modified transmitter is shown in FIG. 3. The components ilustrated, which are arranged in a manner evident from FIG. 2, have the folowing values:

| | |
|---|---|
| $Tr$ | Transistor type OC 345. |
| $C_1'$ | 600 pf. capacitor. |
| $C_2'$ | 1 microfarad capacitor. |
| $R'$ | 25,000 ohm resistor. |
| $R''$ | 50,000 ohm resistor. |
| $L'$ | Coil of 75 turns, 3 mm. diameter. |

The transmitter of FIG. 3 is characterized by a circuit consisting of an oscillator coil $L'$ one end of which is connected to the magnesium cathode $E_1$ of the battery and to the base of the transistor $Tr$ by way of this battery or by other circuit means such as an interposed RC combination of a resistance $R''$ and a condenser $C_2'$. The other terminal of the coil $L'$ is connected to the collector of the transistor, and a tap of the coil $L'$ is connected by a condenser $C'$ to the emitter of the transistor and to the Ag/AgCl electrode $E_2$ of the battery through a resistor $R'$.

The two electrodes of the pH sensing means are incorporated in the lead to the transistor base. The positive silver/silver chloride electrode $E_2$ of the battery simultaneously serves as the reference electrode for the pH sensing arrangement. The testing electrode $E_3$ of the sensing arrangement is an antimony electrode. The normal pH changes in the environment of the transmitter as it passes through the digestive tract cause a shift in the transmitter frequency over a range of more than 100 kilocycles per second when the sensing electrodes are provided in the base lead of the transistor.

With the indicated values of the circuit components, the frequency drift of the transmitter temperature changes between 25° and 40° C. is less than 1 kilocycle per second, even at very high frequencies. At 37.5° C., the transmitter of FIG. 3 has a frequency of 3.7881 megacycles per second in the base circuit when the pH sensing electrodes are short-circuited.

When a transistor of type OC 345 is used, the circuit is capable of operating at a voltage of less than 0.2 volt, and consumes only a few microamperes of current (20–30 $\mu$a.). This makes it possible further to reduce the number of electrodes, and to energize the oscillator by the voltage generated by the testing electrode and the reference electrode when they are immersed in gastric fluid. The circuit elements required for such a modification of the circuit of FIG. 3 can be housed in a casing still smaller than that referred to hereinabove with reference to FIG. 2.

The transmitter can be held stationary at any desired point in the intestinal tract by means of a thread extending to the mouth, or by means of an iron pin inserted in the casing 1 and an electromagnet held against the body. The position of the transmitter in the body may be verified by X-ray examination.

The frequency of oscillations emitted by the transmitter of the invention within the person tested is ascertained in a conventional manner by means of a short wave radio receiver whose aerial is held close to the patient. The position of the transmitter can be determined within one centimeter by means of an aerial coil having a ferrite core.

The pH responsive transmitter of the invention has been used successfully in the routine determination of gastric acid. It avoids the emotional and physical trauma involved in the use of a stomach tube for removing gastric contents for chemical analysis. Its sensitivity is high because of the capacitative feedback employed and the high operating frequency. Because of the simultaneous use of the pH reference electrode as the anode in the energizing battery of the oscillator, the overall dimensions of the transmitter can be held smaller than those of any similar device heretofore available, and smaller than that of many gelatine capsules currently employed for enclosing medications.

Figure 1:
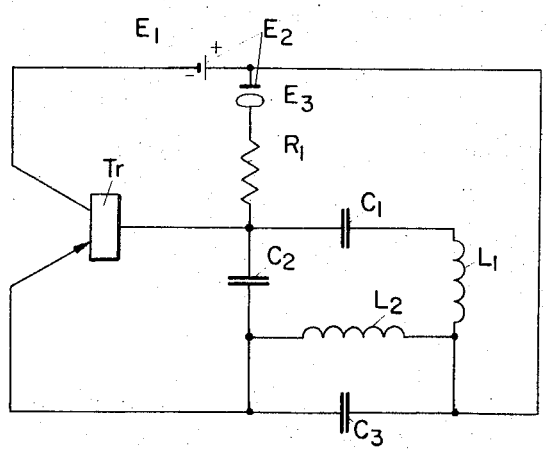
FIG. 1 is the circuit diagram of a first pH responsive transmitter of the invention.

The common electrode of the battery and of the pH sensing arrangement in the illustrative embodiments of the invention shown in FIGS. 1 and 3 is a silver/silver chloride electrode, but it will be appreciated that the invention is not limited to specific electrode materials. A gold/gold chloride electrode has been used successfully as the common electrode of the battery of the pH sensing means, and other electrodes will readily suggest themselves to those skilled in the art on the basis of these teachings to suit specific requirements. Similarly, other testing electrodes than the antimony electrodes specifically disclosed, and other consumable battery electrodes than magnesium electrodes, such as zinc electrodes, are operative.

It should therefore be understood that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What I claim is:

1. An ingestible radio probe comprising, in combination:
    (a) a transistor having a base, a collector, and an emitter;
    (b) a battery having an anode and a cathode;
    (c) a coil having two terminals, means connecting one of said terminals to the anode of the battery and to the emitter of the transistor;
    (d) a first capacitor;
    (e) means connecting said first capacitor between the base of the transistor and the second terminal of said coil;
    (f) a second capacitor;
    (g) means connecting said one terminal of said coil to the base of the transistor through said second capacitor;
    (h) a resistor;
    (i) circuit means for connecting the base of the transistor in series through said resistor to the anode of said battery and through said battery to the collector of the transistor, said transistor thereby being included in an oscillatory circuit; and
    (j) covering means resistant to the fluids within the digestive tract enclosing said oscillatory circuit, whereby said probe may be harmlessly introduced into the digestive tract,
        (1) said circuit means including sensing means responsive to the hydrogen ion concentration within said digestive tract when said probe is positioned within said tract for varying the frequency of oscillation of said oscillatory circuit in accordance with the magnitude of variation in the hydrogen ion concentration in said fluids,
        (2) said sensing means being constituted by a testing electrode and by said anode of said battery,
        (3) said testing electrode and said anode being arranged outside said covering means to generate electrical current between them upon being brought into contact with stomach and intestinal fluids which act as an electrolyte.

2. A probe as set forth in claim 1, wherein said testing electrode and said anode are respectively composed of antimony and of silver/silver chloride.

3. A probe according to claim 1, wherein said testing electrode and said anode are respectively composed of antimony and of gold/gold chloride.

4. An ingestible radio probe comprising, in combination:
    (a) a transistor having a base, a collector, and an emitter;
    (b) a battery having an anode and a cathode;
    (c) an oscillator coil having two terminals and a tap between said terminals, one of said terminals being connected to said collector;
    (d) a first capacitor;
    (e) means connecting said first capacitor between the base of said transistor and the other terminal of said oscillator coil, said other terminal being connected to said cathode;
    (f) a second capacitor;
    (g) means connecting said tap of said oscillator coil to the emitter of the transistor through said second capacitor;
    (h) resistor means;
    (i) circuit means for connecting the base and the emitter of said transistor through said resistor means and said battery, said transistor thereby being included in an oscillatory circuit; and
    (j) covering means resistant to the fluids within the digestive tract enclosing said oscillatory circuit, whereby said probe may be harmlessly introduced into the digestive tract,
        (1) said circuit means including sensing means responsive to the hydrogen ion concentration within said digestive tract when said probe is positioned within said tract for varying the frequency of oscillation of said oscillatory circuit in accordance with the magnitude of variation in the hydrogen ion concentration in said fluids, (2) said sensing means being constituted by a testing electrode and by said anode of said battery, (3) said testing electrode and said anode being arranged outside said covering means to generate electrical current between them upon being brought into contact with stomach and intestinal fluids which act as an electrolyte.

5. An internal radio probe for measuring hydrogen ion concentration in the digestive tract comprising, in combination:

(a) transistor oscillator means;

(b) battery means for energizing said oscillator means while the same is immersed in body fluids, said battery means including two spaced electrode means;

(c) pH sensing means in circuit with said oscillator means for varying the frequency of oscillation thereof responsive to a sensed pH, said pH sensing means including a testing electrode and a reference electrode, said reference electrode constituting one of the electrode means of said battery means; and (d) covering means for protecting said oscillator means against said body fluids in said digestive tract, said two electrode means and the other electrode having respective portions outside said covering means for contact with said fluids.

6. A probe as set forth in claim 5, wherein said reference electrode is a silver/silver chloride electrode.

7. A probe as set forth in claim 5, said oscillator means including capacitative feedback means.

8. An internal radio probe for measuring hydrogen ion in the digestive tract comprising, in combination:

(a) a transistor oscillator;

(b) battery means for energizing said oscillator when immersed in the fluids of said digestive tract;

(c) pH sensing means in circuit with said oscillator for varying the frequency of oscillation of said oscillator responsive to a sensed pH, said battery means and said pH sensing means each including two spaced electrodes, one of said electrodes being common to said battery means and to said pH sensing means; and (d) covering means for protecting a transistor of said oscillator against said fluids, said electrodes having respective portions outside of said covering means for contact with said fluids.

References Cited
UNITED STATES PATENTS 2,231,320  2/1941  Burgess _____ 136—112 X
2,590,584  3/1952  Taylor.

OTHER REFERENCES

Ardenne et al.: "Die Naturwissenschaften," vol. 45, pp. 564, 565, 1958.

Mackay et al.: "Electronics," Engineering Edition, Jan. 3, 1958, pp. 51-53.

RICHARD A. GAUDET, *Primary Examiner.*

ROBERT E. MORGAN, *Examiner.*

W. E. KAMM, *Assistant Examiner.*